United States Patent [19]

Sato

[11] 3,832,049

[45] Aug. 27, 1974

[54] SLIDE TRANSPARENCY PROJECTING AND SIMULTANEOUS SOUND REPRODUCING DEVICE

[76] Inventor: Shinichi Sato, No. 33-10, Miyasaka 3-chome,, Setagaya-ku, Tokyo, Japan

[22] Filed: Dec. 28, 1971

[21] Appl. No.: 213,012

[30] Foreign Application Priority Data
Dec. 31, 1970 Japan.............................. 45-126045

[52] U.S. Cl.................................. 353/19, 274/4 F
[51] Int. Cl. ........................................... G03b 31/06
[58] Field of Search .............................. 353/15–19, 353/112; 274/4 F

[56] References Cited
UNITED STATES PATENTS

| | | | |
|---|---|---|---|
| 3,561,856 | 2/1971 | Castedello | 353/19 |
| 3,582,082 | 4/1971 | Takagi | 274/4 F |
| 3,658,193 | 4/1972 | Gross | 274/4 F |
| 3,659,857 | 5/1972 | Marcinkus | 274/4 F |

FOREIGN PATENTS OR APPLICATIONS

| | | | |
|---|---|---|---|
| 1,051,027 | 2/1959 | Germany | 353/112 |

*Primary Examiner*—William D. Martin, Jr.
*Assistant Examiner*—A. Jason Mirabito

[57] ABSTRACT

A slide transparency projecting and simultaneous sound reproducing device adapted to sequentially project a plurality of slide transparencies each incorporated in a tape cassette is provided, and simultaneously with projection, the sound reproduction is effected.

Such tape cassettes each incorporating a slide transparency are sequentially and automatically fed to a projection and sound reproduction position in a device consisting of, say, a combination of a slide transparency projector and a sound reproducing device (for example, a cassette tape recorder). Accordingly, one can watch the projected screen and at the same time can listen to the text of the illustration being projected. This device provides a useful combination of a slide transparency projector and sound device which have remained desirable hitherto.

4 Claims, 10 Drawing Figures

PATENTED AUG 27 1974　3,832,049

Shinichi Sato
INVENTOR

BY Clair Cum, agt

ATTORNEY

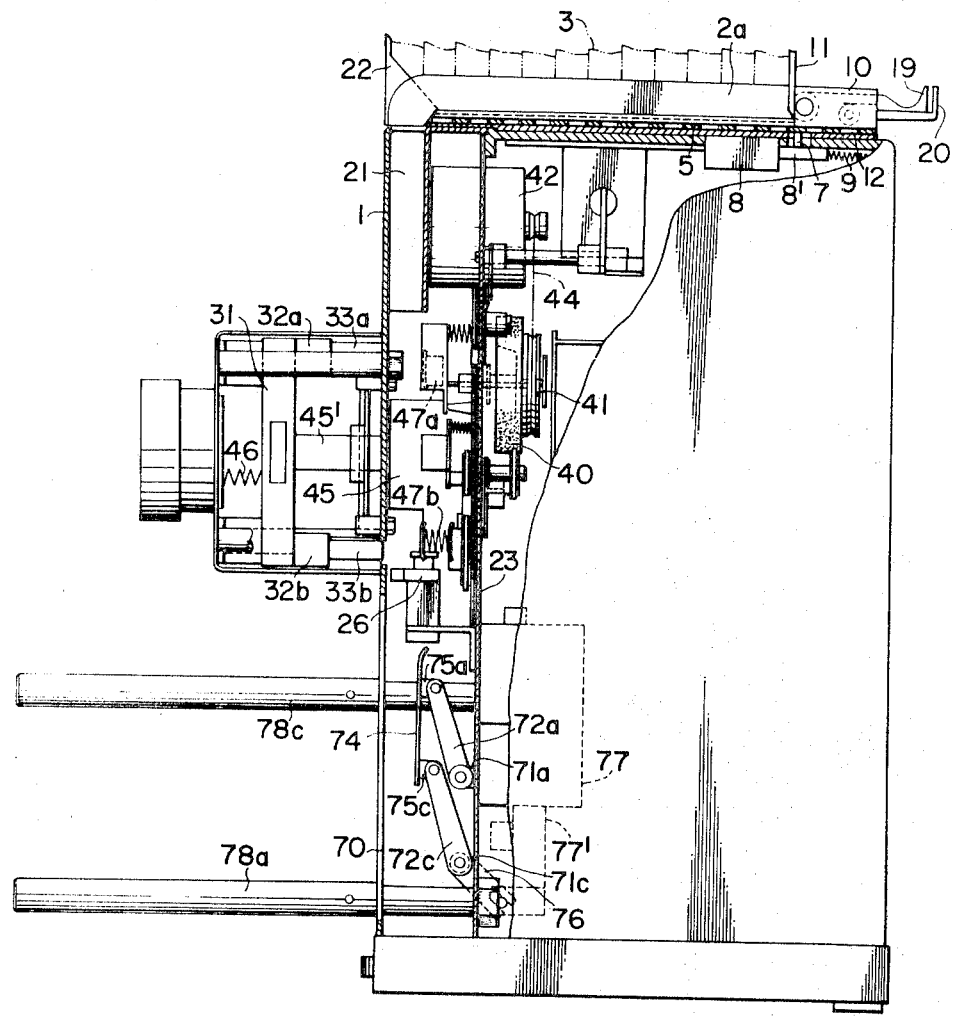

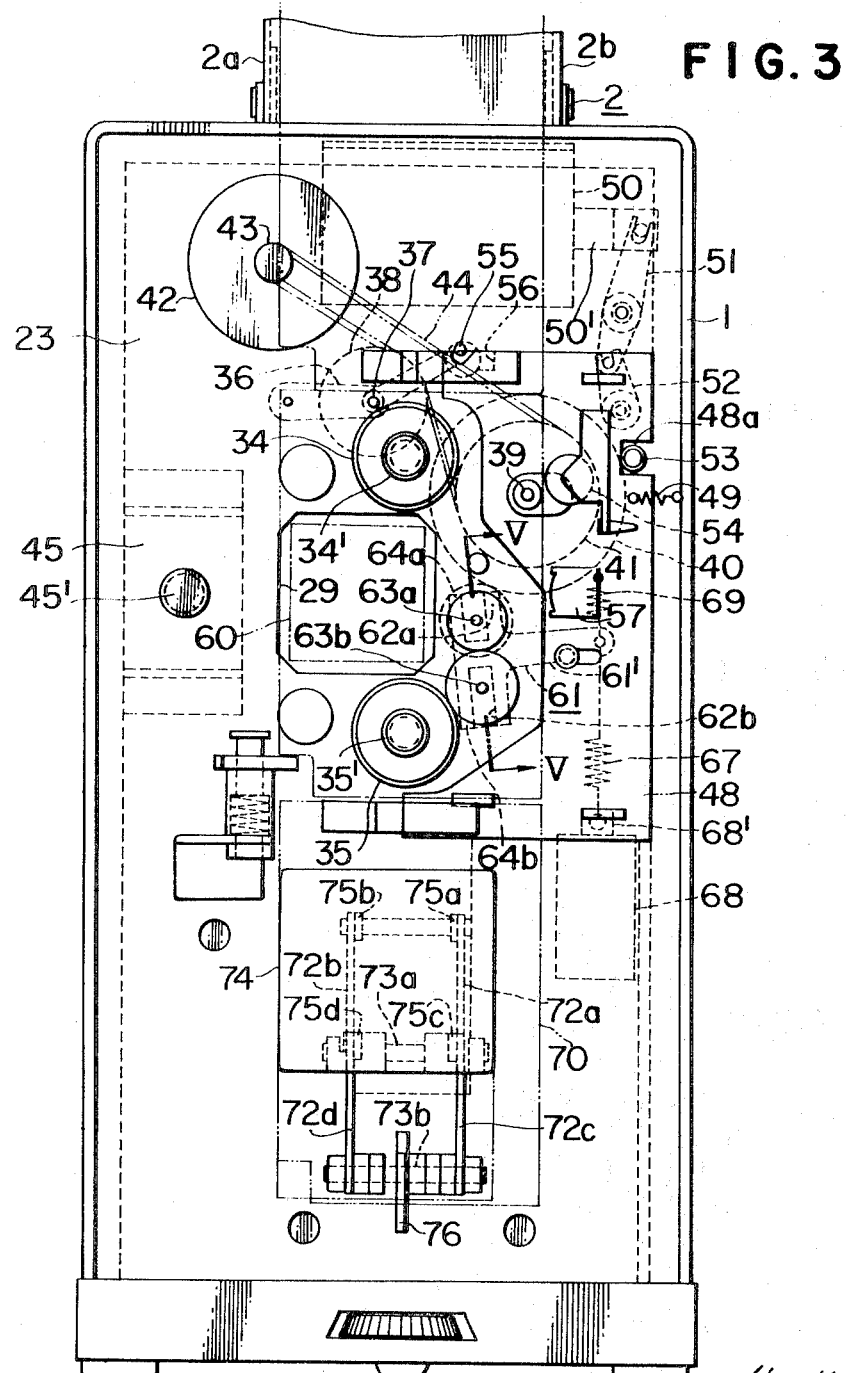

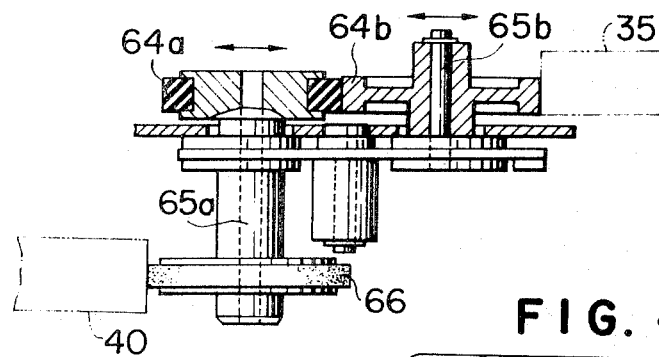
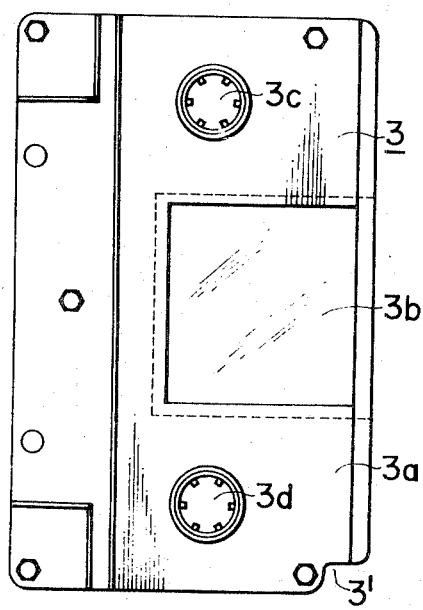
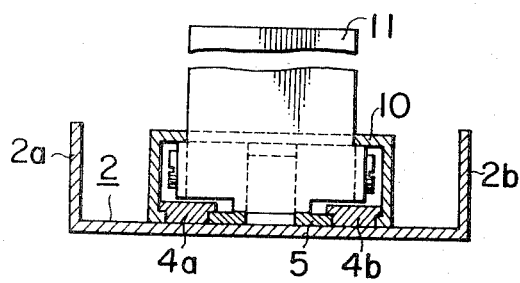

SLIDE TRANSPARENCY PROJECTING AND SIMULTANEOUS SOUND REPRODUCING DEVICE

BACKGROUND OF THE INVENTION

This invention relates to a slide transparency projecting and simultaneous sound reproducing device adapted to sequentially and automatically project a plurality of tape cassettes each having a slide transparency.

Recently, a variety of slide transparency projectors have been available in the market together with many types of tape recorders. However, one can not listen to the text of the illustration nor watch the screen at the same time without assembling such individual devices into one unit with troublesome efforts. To overcome such a trouble, there is provided a slide projecting and simultaneous sound reproducing device which affords extremely handy but efficient features. In the device, the cassettes each incorporating a slide transparency are automatically fed to the device, so that one can enjoy the slide transparency projection, while listening to the audio illustration.

SUMMARY OF THE INVENTION

Accordingly, one object of the invention is provide a handy but efficient means by which one can enjoy the slide transparency projection and the audio illustration for many useful applications.

Another object of the invention is to provide a slide projecting and simultaneous sound reproducing device in which a plurality of cassettes each having slide transparencies are sequentially and automatically fed for projecting and sound reproducing purposes to a predetermined position and taken out therefrom.

In further details, this invention provides a device comprising means for sequentially feeding a plurality of tape cassettes each having slide transparency into a passage provided in the front portion of a casing; means for setting such cassettes at a level corresponding to a projection and sound reproduction position in said passage; means for urging into a predetermined position said tape cassette having a slide projecting transparency, said position corresponding to the projection and sound reproduction position; means for effecting the required projection and sound reproduction by shifting parts to positions required for projecting and sound reproducting operations in cooperation with said urging operation; means for transferring tape cassettes having slide transparencies to a lower position in said passage; and means for discharging and stacking said cassettes having slide transparencies.

BRIEF DESCRIPTION OF THE DRAWINGS:

FIG. 2 is a longitudinal cross-sectional elevational view of FIG. 1;

FIG. 3 is an elevational view of a tape cassette incorporating slide transparency;

FIG. 4 is a side elevational view of a typical cassette;

FIG. 5 is a cross-sectional view taken along the line V—V of FIG. 3;

FIG. 6 is a cross-sectional view taken along the line VI—VI of FIG. 1;

FIG. 7 is a perspective view of a locating piece;

DETAILED DESCRIPTION OF THE PREFERRED EMBODIMENT

Figure 1:
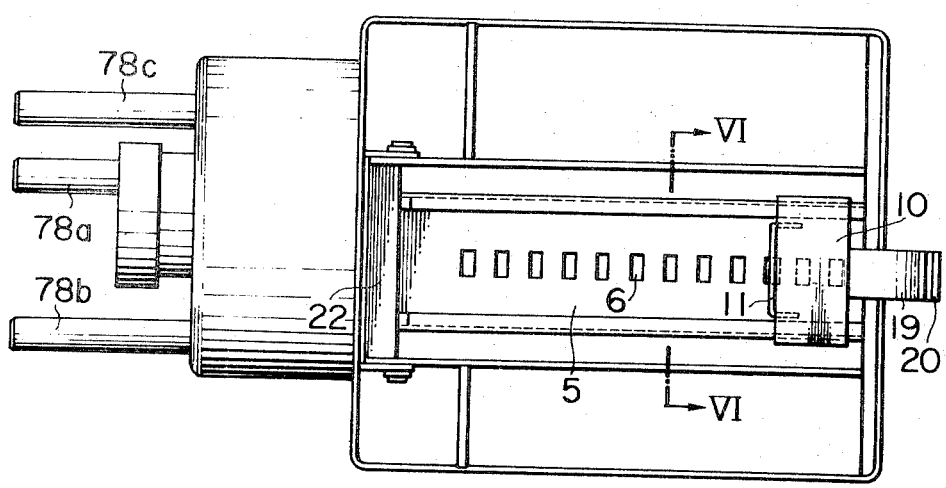
FIG. 1 is an explanatory plan view of a slide transparency projecting and simultaneous voice reproducing device of the present invention.
Figure 8:
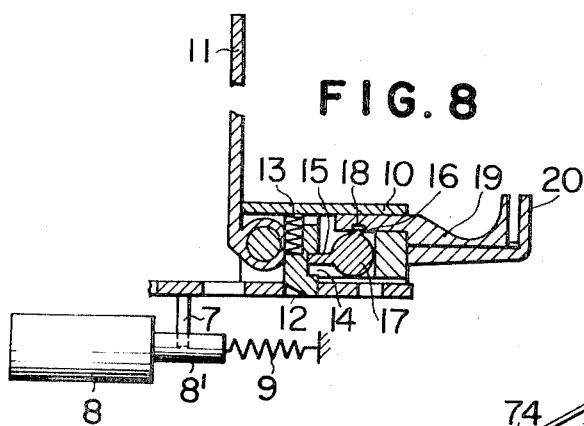
FIG. 8 is a fragmentary, longitudinal sectional view of the indexing means shown in FIGS. 1 and 6.
Figure 10:
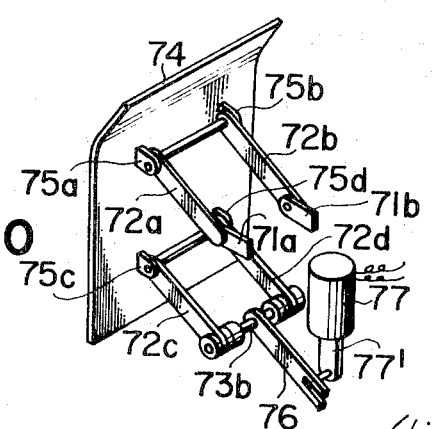
FIG. 10 is a perspective view of cassette discharge means used in the present invention.
Figure 9:
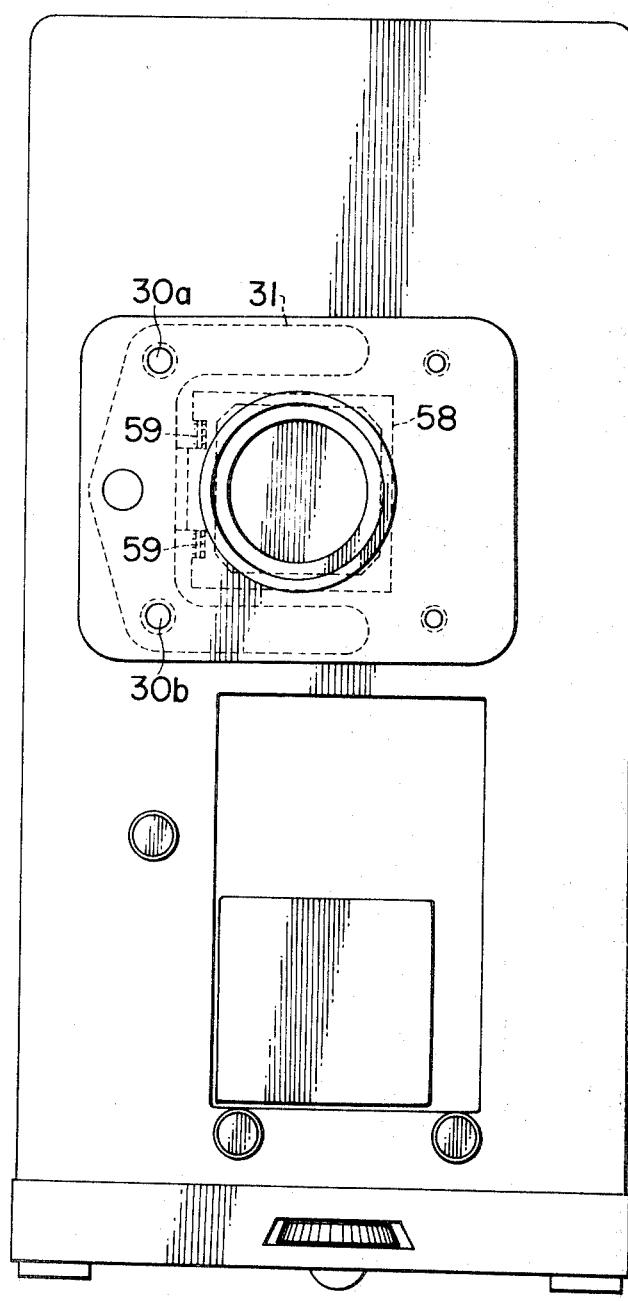
FIG. 9 is a front elevational view of the apparatus shown in FIG. 1.

Referring now to FIGS. 1 to 3, there is provided a guide (2) having side walls (2a) and (2b) on the top surface of an outer casing of a projecting and voice reproducing device (1). The guide (2) extends from the rear portion to the front of said outer casing (1), and a plurality of tape cassettes with slide transparencies (3) are placed in a vertical direction and are adapted to move in side by side relation along said guide (2), the tape cassettes with slide transparencies (3) being each composed of tape cassette (3a) and a slide transparency (3b), as shown in FIG. 4. In the central portion of the guide (2), there extend two rails (4a) and (4b) on which, in practice, said tape cassettes with slide transparencys (3) are adapted to slide.

There is provided a slide transparency arresting plate (5) extending in the same direction as that of said guide (2) and adapted to be slidably guided by means of the inner ledge portions of said rails (4a) and (4b).

Provided in arresting plate (5) is a plurality of square arresting perforations (6) which extend along the axial direction of said plate (5), the pitch of said square arresting perforations (6) being substantially equal to the thickness of said tape cassette with slide transparency (3). Spanning said rails (4a) and (4b) is a saddle (10) adapted to be slidably guided by the outer ledge portions of said said rails (4a) and (4b). Depending from the lower surface of the arresting plate (5) is a connecting piece (7), to the lower edge of which is secured the armature (8′) of a solenoid (8), with said armature (8′) held to a predetermined position by means of a tension spring (9), so that when said solenoid (8) is energized, said arresting plate (5) may be advanced against the action of said spring (9) by a distance corresponding to the pitch of said squre arresting perforations (6). The saddle (10) is adapted to be slidably guided by the outer ledge portions of said rails (4a) and (4b) is so provided as to span said rails (4a) and (4b). The base portion of an urging plate (11) is pivotally secured to the tip portion of the saddle (10), said urging plate being adapted to urge said tape cassettes with slide transparencies. Included with said saddle (10) is an arresting pawl (12) which is adapted to freely extend in and to be retracted through said perforation (6). The arresting pawl (12) is adapted to be normally urged by means of a spring (13) in a direction which permits the engagement of an square arresting perforation (6), with a notch portion (14) formed on the side surface thereof. Rotatably bridged over the opposite walls of said saddle (10) is a rotary element (17) which is provided with an arresting projection (15) extending in a horizontal direction in such a manner as to engage the notch portion (14) and with a projection (16) extending in a direction which is at right angle to that of said projection (15). There is provided a trigger (19) having a notch portion (18) adapted to engage said arresting projection (16), with the receiving member (20) affixed to said saddle (10). Provided in the front portion of said outer casing (1) is a passage (21) through which drops and is guided said tape cassette with a slide transparency (3). Provided at the entrance of said passage (21) is an abutting plate (22) which is adapted to arrest the advancing movement of said tape cassette with a slide transparency (3) and which serves to guide the same into said passage (21). The base portion of said abutting plate (22) is pivotally secured to said outer casing (1) and engages said casing (1) in a vertical direction thereof. Below said passage (21) on a base plate (23), there is provided, as shown in FIG. 7, a rotary shaft (25) extending upwardly from a bracket (24) and mounted thereon. Fitted on said rotary shaft (25) is a cylindrical body (26') integral with a hook shaped locating piece (26), said body (26') being adapted to move axially and to rotate. Mounted inside the body (26') is a coil spring (27), with one end thereof anchored to said piece (26) and with the other anchored to said bracket (24).

The coil spring (27) is adapted to be twisted when compressed. Thus, when a tape cassette with a slide transparency (3) drops through said passage (21), with a notch portion (3') thereof (FIG. 4) abutting against said locating piece (26), then said piece (26) will be lowered, against the action of spring (27) due to the weight of the tape cassette with a slide transparency (3), to a position corresponding to projection and voice reproduction position, while said locating piece (26) is rotated to a position in which said piece (26) may rest on a stop (28).

Mounted on and protruding in a horizontal direction from the circumference of a projection opening (29) in the front portion of said outer casing (1) are guide poles (30a) and (30b) by which a 'U' shaped supporting piece (31) is slidably guided. Mounted on and protruding from said 'U' shaped supporting piece (31) are poles (32a) and (32b) having smaller diameter portions, said poles piercing through said outer casing. Fitted loosely in the tip portion of poles (32a) and (32b) are rotary arresting tubes (33a) and (33b) having configuration in which the outer peripheries of said poles (32a) and (32a) are adapted to be fitted into the holes of a takeup hub (3c) and a rewinding hub (3d) of said tape cassette with slide transparency. Rotatably mounted on said base plate (23) are rotary transmission wheels (34) and (35) which have in the center portions thereof hubs (34') and (35') similar to hubs (3c) and (3d) into which are fitted said arresting tubes (33a) and (33b), said wheels (34 and 35) having rubber linings on the peripheries thereof. On the other hand, pivotally mounted on said base plate (23) is a bent rocking lever (36). Pivotally mounted on the bent portion of lever (36) is a transmission rubber roller (37), the axle of said roller (37) having an idler pulley (38) fixedly mounted thereon. Pivotally mounted on said base plate (23) is a capstan (39) which is adapted to be inserted into a capstan hole of said tape cassette with slide transparency (3), said capstan (39) fixedly mounting a fly wheel (40) and a pulley (41) thereon. A belt (44) is trained about said pulley (38), said pulley (41) and the output shaft of a drive motor (42). Connected to said 'U' shaped supporting piece (31) is a movable portion of said solenoid coil (45), the connection being made in such a manner that when said solenoid coil (45) is energized, said supporting piece (31) may be moved toward the projection and voice reproduction section and that when said coil (45) is not energized, said supporting piece (31) may be prevented by means of a spring (46) from moving in a reverse direction.

Said solenoid coil (45) is so arranged as to be energized by means of a micro-switch when said tape cassette with slide transparency (3) urges said locating piece (26) downwardly and to be de-energized by means of a detected signal which is caused by means of increased tension when a tape has been fully taken up on said takeup hub (3c).

Said tape cassette with slide transparency (3) that is urged into a position by means of poles (32a) and (32b) having smaller diameter portions and integral with said supporting piece (31) is so arranged as to be set at a predetermined position by means of receiving members (47a) and (47b) supported by a spring. On the other hand, slidably mounted in a lateral direction on said base plate (23) is a slide plate (48) which is held by means of a spring (49) to a position moving in one direction. Connected to movable portion (50') of solenoid coil (50) is one end of pivotally supported lever (51) with the other end connected to one end of another pivotally supported lever (52). The other end of said pivotally supported lever (52) engages by way of roller (53) the notched portion (48a) formed on the side edge of said slide plate (48), so that when said solenoid coil (50) is energized, said slide plate may be moved against the action of said spring (49) in the other direction. At this time, a pinch roller (54) pivotally mounted, by way of an spring loaded arm on the slide plate (48) will abut said capstan (39), and a roller (55) pivotally mounted on a rocking portion of said rocking lever (36) will drop in a notch portion (56) formed in the upper edge of said slide plate (48), thereby bringing said roller (37) into abutting relation with said wheel (34). Furthermore, a head (57) fixed to slide plate (48) will abut the tape of tape cassette with slide transparency (3). For the projection opening (29), there is provided a shutter (58) which is normally shut by means of spring (59) and adapted to open by means of said supporting piece (31) engaging said shutter, when said supporting piece is displaced.

Shown at (60) is an opening for use in projecting a slide transparency the opening (60) being provided in said base plate (23). On the other hand, a 'T' shaped supporting piece (61) is pivotally mounted at its center on the base plate (23) and grooves (62a) and (62b) are formed in the opposite wings of supporting piece (61), sliding elements (63a) and (63b) each having an 'H' shaped cross-section are slidably fitted in said grooves (62a) and (62b) and wheels (64a) and (64b) are rotatably mounted on shafts (65a) and (65b) of said sliding elements (63a) and (63b), said wheels (64a) and (64b) being in contact with each other. A wheel (66) is fixedly mounted on said shaft (65) with the wheel (66) being so arranged as to frictionally engage the fly wheel (40) that is integral with said capstan (30) and the wheel (64b) is so arranged as to frictionally engage the wheel (35) having said hub (35') in its center. The central leg (61') of said supporting piece (61) is connected to one end of a spring (67) that extends in a direction at a right angle to that of said central leg (61'), the other end of said spring (67) being connected to the movable portion (68') of solenoid coil (68) that is fixed to said base plate (23). Central leg (61') is also connected to one end of a spring (69) extending in a direction opposite to that of said spring (67) and the other end of the spring (69) is affixed to said base plate (23). Accordingly, when said solenoid coil (68) is not energized, said wheels (66) and (64) will come out of contact with each other, thus maintaining the neutral position, and when energized, the wheels are brought into contact, said solenoid coil being adapted to be energized when the tape has fully been taken up on said take-up hub (3c).

Mounted on and protruding from the base plate (23) to the rear of a discharge opening (70) are brackets (71a), (71b), (71]c) and (71d), to which are pivotted by way of shafts (73a) and (73b) the base portions of each of links (72a), (72b), (72c), and (72d), respectively. The rocking ends of the links (72a), (72b), (72c) and (72d) are pivotted on an urging plate (74) at its four corners by way of brackets (75a), (75b), (75c) and (75d).

One end of an operating lever (76) is affixed to said shaft (73b) to which are integrally connected the base portions of said links (72c) and (72d), with the other end thereof connected to the tip portion of the armature (77') of a solenoid coil (77) provided on the back of said base plate (23). There are provided three guiding and stacking rods (78a), (78b) and (78c) which extend in a forward direction from the lower and side portions of said discharging opening (70) which are spaced by a predetermined distance from each other. Said tape cassettes with slide transparencies (3) are adapted to be stacked in a slanted relation on the guiding and stacking rods (78a), (78b) and (78c).

In operation, when the solenoid coil (8) is energized, with a plurality of tape cassettes with slide transparencies placed in side by side relation on the guide (2), the arresting plate (5) will be advanced along the rails (4a) and (4b) against the action of the spring (9) by a distance corresponding to the thickness of a tape cassette with a slide transparency (3). As a result, the saddle (10) integral with the arresting plate (5) by way of arresting pawl (12) will correspondingly advance along the rails (4a) and (4b), so that the urging plate (11) will urge a group of tape cassettes with slide transparencies (3) in an advancing direction, thereby feeding the tape cassettes with slide transparencies one after another to a projection and voice reproduction position. In this connection, the reproduction position should be empty.

After a tape cassette with slide transparency (3) has been fed to the projection and voice reproduction position and the solenoid coil (8) has been de-energized, the arresting plate (5) will be retracted by means of the spring (9). However, since the the arresting pawl (12) engaging arresting plate (5) is in a slanted position, said arresting pawl (12) will slip and come out from the square arresting perforation (6) against the action of the spring (13), so that the arresting plate (5) will move irrespective of the movement of the arresting pawl (12) and return to the initial position. Accordingly, the saddle (10) integral with urging plate (11) is retained in an advancing position.

By repeating the above cycle in this manner, the tape cassettes with slide transparencies are in turn fed to the projection and voice reproduction position. When the tape cassettes with slide transparencies (3) are charged, the rotary element (17) may be rotated by holding a thumb on the edge portion of receiving member (20), while pressing the trigger (19) with the first finger. The arresting projection (15) will then urge the arresting pawl (12) upwardly against the action of spring (13).

As a result, the arresting pawl (12) will be disengaged from the arresting piece (5), and the saddle (10) will be brought into a free condition. Accordingly, when the trigger (19) is released, after the tape cassettes with slide transparencies (3) have been held between the abutting plate (22) and the arresting plate (11), then each of the parts will return to the initial position by the action of spring (13). Thus, the tape cassettes with slide transparencies are ready to be fed. In passing, the urging plate (11) and abutting plate (22) may preferably be collapsed for a compact construction when not in operation.

Subsequently, when a tape cassette with a slide transparency (3) is inserted into the front passage (21), the tape cassette with a slide transparency (3) will drop on to the locating piece (26) with the notch portion being engaged, and then it will be lowered against the action of spring (27) by means of gravity to a predetermined position.

Then, the solenoid coil (45) is energized by means of a microswitch, and the supporting piece (31) is moved to the projection and voice reproduction position. As a result, the arresting tubes (33a) and (33b) that are fitted into the poles (32a) and (32b) having smaller diameters and integral with said supporting piece (31) are inserted into the hubs (33a) and (33b) in the tape cassette with slide transparency (3) and further into the hubs (34') and (35') in wheels (34) and (35). At this time, the tape cassette with a slide transparency (3) is resiliently supported by the receiving members (47a) and (47b) to thereby be set to a predetermined position.

When, the micro-switch is actuated, the solenoid coil (50) is energized and the slide plate (48) moves against the action of spring (49). It follows then that roller (53) is brought into engagement with the notch portion (56), so that the roller (37) abuts the wheel (34). The rotation of the motor (42) is transmitted by way of the belt (44) to said wheel (34) and then to the take-up hub (3c) in the tape cassette with a slide transparency (3) by way of the arresting tube (33a) to thereby take up the tape. At the same time, the pinch roller (54) abuts the capstan (39), while the head (57) is brought into contact with tape so as to effect the voice reproduction. Simultaneously therewith, when the supporting piece moves, the shutter (58) that is engagement with said supporting piece (31) will be opened to thereby open the projection opening (29), so that slide projection is put into operation.

Then, when the tape has been fully taken up on take-up hub (3c) after the required projecting and voice reproducing operations, then the take-up hub (3c) is released from the drive system, and at the same time, the solenoid coil (68) will be energized to effect the rotation of the supporting piece (61) by way of the spring (48). As a result, the wheels (64a) and (64b) move in contact relation with each other and then eventually the wheels (66) and (64b) are brought into contact with wheels (40) and (35), respectively, and accordingly the rotation of the fly wheel (40) is transmitted to the wheel (64b) and the wheel (64a) integral therewith and then to the wheel (63b) in contact therewith and then to the take-up hub (3d).

In this manner, the tape can be rewound at a high speed. Upon completion of rewinding, the tape cassette with slide transparency (3) is urged out of position and drops through the passage downwards and reaches the lower end thereof. Then, the solenoid coil (77) is energized and then the operating lever (76) is pivotally moved, thereby causing the links (72c) and (72d) to pivotally rotate by way of shaft (73). Since these elements form the parallel link mechanism, the urging plate (74) moves to a front position in parallel relation. Accordingly, the tape cassette with slide transparency (3) is discharged through opening (70) onto the guiding and stacking rods (78a), (78b) and (78c).

As is apparent from the foregoing, the present invention provides a slide projecting and simultaneous voice reproducing device wherein a plurality of tape cassettes with slide transparencies which have been charged are automatically fed to the projection and voice reproduction position, then discharged and aligned to position. It is advantageous that the device of the present invention is simple in construction and can well achieve the desired results.

I claim:

1. A slide projector and simultaneous sound reproducing device for use with a plurality of tape cassettes each having a slide transparency, said device comprising:
    a casing having a passage in the front portion thereof for permitting movement of the cassettes therethrough, said casing further including a discharge opening;
    means for sequentially feeding the cassettes along a first linear path into the passage in said casing;
    means for sequentially moving said cassettes along a second linear path that is perpendicular to the first linear path and for locating the cassettes at a projection and sound reproduction position in said passage;
    means for successively urging each cassette into a predetermined position corresponding to the projection and voice reproduction position;
    means for effecting the required projection and sound reproduction;
    means for sequentially transferring each cassette along a continuation of the second path to a lower position in said passage;
    means for sequentially discharing the cassettes from the casing;
    means for stacking the discharged cassettes;
    a guide member extending in a first direction parallel to the first linear path;
    a carrier having an urging member for urging said tape cassettes in the first direction;
    an arresting piece extending in the first direction, said arresting piece including a plurality of perforations arranged in a row parallel to the first path, the dimension between centers of adjacent ones of the perforations corresponding to the width of each tape cassette;
    an electro-magnetic mechanism for advancing and retracting said arresting piece by a dimension corresponding to the dimension between centers of adjacent ones of the perforations;
    an arresting pawl adapted to be resiliently supported by said carrier and to engage said arresting perforations; and
    means for forcibly releasing the engagement of said arresting pawl from said perforations in said arresting piece.

2. A device according to claim 1 wherein there is further included a tape take-up device comprising:
    a T-shaped supporting piece pivoted on the central leg thereof;
    spring means for biasing the central leg of said supporting piece towards and away from a neutral position;
    sliding elements provided at the opposite wings of said supporting piece;
    first and second wheels in contact with each other and rotatably mounted on said sliding elements;
    a third wheel cooperating with one of said first and said second wheels;
    a fourth wheel adapted to selectively and frictionally engage said first and said third wheels;
    a rewinding hub and a fly wheel arranged to frictionally engage said fourth wheel whereby a tape may be rewound when said first and said third wheels each abut against said fly wheel and said rewinding wheel, respectively; and
    an electro-magnetic mechanism for pivotally displacing the central leg of said supporting piece.

3. A device according to claim 1 wherein said discharging and stacking means comprises:
    an urging plate including a parallel linkage mechanism disposed at a position corresponding to that of the discharge opening in said casing; and
    guiding and stacking rods protruding from and mounted about the periphery of said discharge opening in said casing, said guiding and stacking rods being adapted to receive and stack the tape cassettes.

4. A device according to claim 1 wherein said locating means comprises:
    a locating member disposed on one side of the passage in said casing and arranged so as to position the cassettes at a level corresponding to the projection and sound reproduction position by means of the weight of the cassettes;
    means for urging the cassettes inwardly at the projection and sound reproduction position;
    a drive motor and a transmission belt driven thereby;
    take-up and rewind means in said casing; and
    means for connecting said transmission belt to each of said take-up and said rewinding means.

* * * * *